(12) United States Patent
Matsumoto

(10) Patent No.: US 8,036,534 B2
(45) Date of Patent: Oct. 11, 2011

(54) OPTICAL TRANSMITTER OUTPUTTING A PLURALITY OF SIGNAL LIGHT WITH A PRESET WAVELENGTH SPAN

(75) Inventor: Kengo Matsumoto, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 451 days.

(21) Appl. No.: 12/320,295

(22) Filed: Jan. 22, 2009

(65) Prior Publication Data
US 2010/0183307 A1 Jul. 22, 2010

(51) Int. Cl.
*H04J 14/02* (2006.01)
(52) U.S. Cl. .............................. 398/95; 398/93; 398/79
(58) Field of Classification Search .................... 398/95, 398/93, 79
See application file for complete search history.

(56) References Cited

U.S. PATENT DOCUMENTS 7,245,833 B1 * 7/2007 Volkening ..................... 398/116
7,657,179 B2 * 2/2010 Mahgerefteh et al. .......... 398/82

FOREIGN PATENT DOCUMENTS
WO 03/003084 1/2003

OTHER PUBLICATIONS

Matsui et al., Chirp-Managed Directly Modulated Laser (CML), IEEE Photonics Tech Letters, vol. 18, No. 2, Jan. 15, 2006.

* cited by examiner

*Primary Examiner* — Kinam Park
(74) *Attorney, Agent, or Firm* — Smith, Gambrell & Russell, LLP

(57) ABSTRACT

An optical transmitter that multiplexes a plurality of signal light each having less chirp characteristic by the CML technique is disclosed. The optical transmitter comprises a plurality of optical modules, a plurality of TEC controllers each driving the TEC in the optical module, a de-multiplexer that de-multiplexes the output of respective modules, an etalon filter, and a monitoring unit that monitors the component of the signal light output from respective modules. The TEC controller controls the temperature of the LD in the module such that two emission wavelengths of the LD each corresponding to the ON level and the OFF level is set in both side of one of the critical wavelengths of the etalon filter where the transmittance thereof becomes a maximum.

10 Claims, 6 Drawing Sheets

OPTICAL TRANSMITTER OUTPUTTING A PLURALITY OF SIGNAL LIGHT WITH A PRESET WAVELENGTH SPAN

BACKGROUND OF THE INVENTION

The present invention relates to an optical transmitter that emit plurality of signal light with specific wavelengths different from each other.

RELATED PRIOR ART

One type of optical transmitters applicable in the optical communication system directly modulates a semiconductor laser diode (hereafter denoted as LD) to emit signal light by providing the driving current modulated with high frequencies, which has been called as the direct modulating system. In this direct modulating system, the carrier density in the active layer of the LD varies in the ON level when the driving current is substantially provided and in the OFF level when the driving current is absent, which shifts the emission wavelength of the LD and has been called as the chirp or the wavelength chirp. Because the optical fiber that transmits the signal light inherently has the dispersion, that is, the velocity of the light transmitted therein slightly depends on the wavelength of the light; the light with the chirp degrades the waveform when it is transmitted through the optical fiber, which increases the rate to recover the transmitted data erroneously at the receiver.

Thus, the direct modulation restricts the transmission distance because the degradation of the waveform accumulatively depends on the length of the optical fiber. For instance, the transmission distance is limited to 10 km when the system transmits the optical data with the communication speed of 10 Gbps in the form the NRZ (non-return-to-zero). Therefore, the optical communication system for the long distance usually applies other modulation techniques except for the direct modulation, for instance, the system uses the electro-absorption (hereafter denoted as EA) modulation or the Mach-Zender (hereafter denoted as MZ) modulation, but these techniques are necessary to implement additional devices; accordingly the systems are generally cost-ineffective.

Recent optical communication system increases its transmission speed from 10 to 40 or 100 Gbps as the communication volume rapidly and drastically increases, and requests an optical transmitter able to respond to such a high speed data. Even the indirect modulation technique using the MZ modulator that provides the lithium niobate crystal or the EA modulator of semiconductor materials described above has the limit in the transmission distance of a few kilo-meters when the data with the NRZ form has the transmission speed of 40 to 100 Gbps. One method to overcome the limitation of the transmission distance and to enhance the communication volume is that a plurality of optical signals each having different wavelengths is multiplexed.

Another technique to modulate light emitted from the LD has been proposed by Matsui, et al. in IEEE Photonics Tech. Lett., 18(2) (2006). The technique disclosed therein is called as the chirp-managed directly modulated laser diode (hereafter denoted as CML). This CML technique directly modulates the LD to obtain signal light and transmits this signal light through a filter with a sharp cut-off characteristic, typically the etalon filter, in order to cut only the component when the driving current applied to the LD is in the OFF level. Because the CML technique cuts the portion of the light from the directly modulated LD, which effectively reduces the chirp, the optical transmission system becomes able to transmit the signal light over 100 km as leaving the size of the optical transmitter compact. Thus, by generating each signal light used in the multiplexing system described above by the CML technique, the communication system with 40 to 100 Gbps transmission speed and the distance longer than 100 km may be realized.

However, the CML technique described above inherently has a subject that the technique is necessary to be implemented with a wavelength selective filter to cut the component corresponding to the OFF level of the LD and is necessary to control the light transmitting property of this filter precisely. Because the transmittance of the etalon filter with respect to the wavelength depends on a temperature thereof, it is inevitable for the CML technique to provide a thermo-electric controller, such as a Peltier device, to control the temperature precisely and to need a driver circuit for the thermo-electric controller. When the optical communication system that implements a plurality of light sources each using the CML technique, the system is necessary to provide a plurality of Peltier devices and a plurality of driving circuits, which results in the greater sized optical transmitter.

The present invention is to solve the subjects above, and is able to increase the equivalent transmission speed by multiplexing a plurality of signal light each using the CML technique with a compact size.

SUMMARY OF THE INVENTION

An aspect of the present invention relates to an optical transmitter that outputs at least two signal light with a preset wavelength span. The optical transmitter comprises at least two optical modules, a multiplexer, an etalon filter and a monitoring unit. Each optical module includes an LD, a thermo-electric controller, and a TEC driver. The LD is modulated with an electrical signal with an ON level and an OFF level to emit the signal light containing a first wavelength that corresponds to the ON level and a second wavelength that corresponds to the OFF level. The thermo-electric controller, typically a Peltier device, controls a temperature of the LD. The TEC driver drives the thermo-electric controller.

In the present invention, one of the optical modules outputs one of signal light and the other of the optical modules outputs another signal light. The multiplexer multiplexes at least two signal light output from respective optical modules. The etalon filter, which has a periodic transmittance with a period substantially coinciding with the preset wavelength span of signal light, receives the output of the optical multiplexer. The monitoring unit, receiving an output of the etalon filter, outputs monitored signals each corresponding to one of signal light.

In the present invention, the TEC driver in one of the optical modules controls the temperature of the LD such that the first wavelength and the second wavelength of the signal light output from the LD locate in both sides of a critical wavelength of the etalon filter where a variation of the transmittance becomes a maximum. The critical wavelength corresponding to one of at least two optical modules is different from the critical wavelength corresponding to the other of at least two optical modules.

The critical wavelengths each corresponding to the optical module may be adjacent to each other in the periodic transmittance of the etalon filter, or, may be apart to each other putting at least one critical wavelength of the etalon filter.

DESCRIPTION OF PREFERRED EMBODIMENTS

Next, preferred embodiments of the present invention will be described in detail as referring to accompanying drawings. In the description of the drawings, the same numerals or symbols will refer to the same elements without overlapping explanations.

Figure 1:
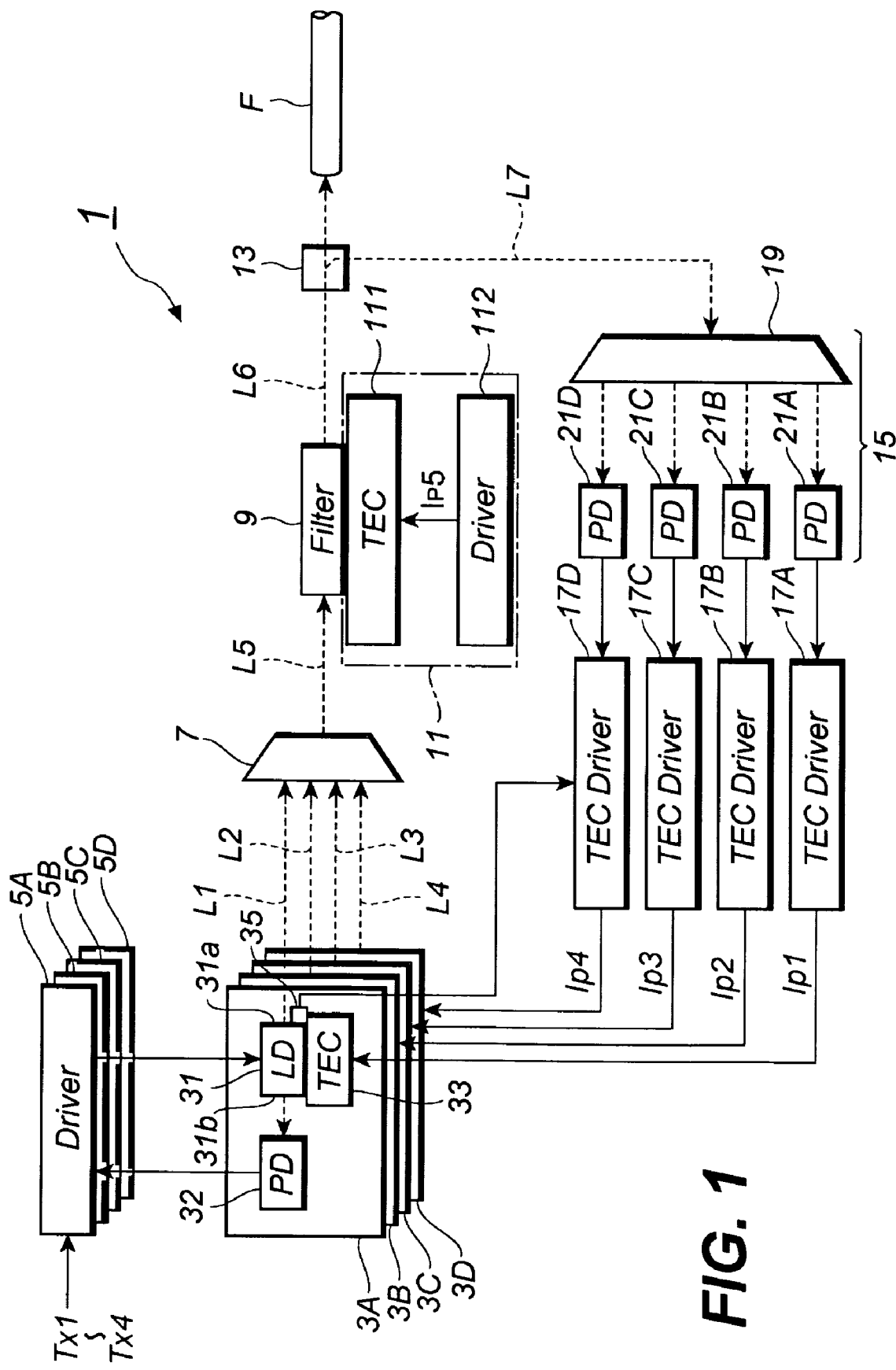
FIG. 1 is a block diagram of an optical transmitter according to an embodiment of the invention.
Figure 2:
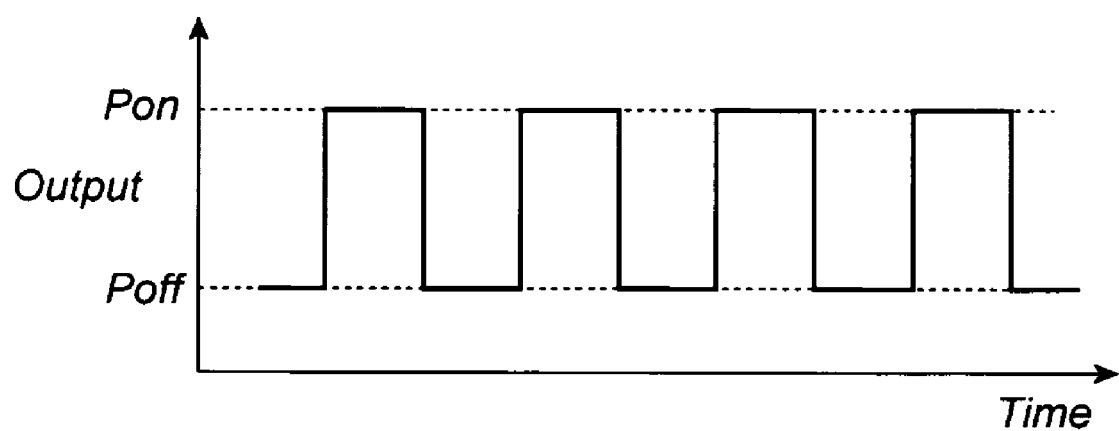
FIG. 2 schematically illustrates a waveform of signal light.

FIG. 1 is a block diagram of an optical transmitter 1 according to an embodiment of the present inventions. This optical transmitter 1 emits light to the single optical fiber F, where the light output from the transmitter 1 is multiplexed with four signal light, L1 to L4, each being modulated with electrical transmission signals, Tx1 to Tx4, provided from the outside of the transmitter 1. The optical fiber F is coupled with an optical receiver, which is not illustrated in FIG. 1. The signal light, L1 to L4, each having the wavelength, λ1 to λ4, respectively, that follows the standard of the coarse wavelength division multiplexing (hereafter denoted as CWDM). Each signal light, L1 to L4, is modulated so as to show the primary power $P_{ON}$ that corresponds to the ON state of the transmission signal and the secondary power $P_{OFF}$ corresponding to the OFF state thereof with a fundamental period of, for instance, 10 Gbps. Multiplexing the signal light, L1 to L4, the optical transmitter 1 realizes the transmission speed of 40 Gbps.

Referring to FIG. 1, the optical transmitter 1 comprises a plurality of optical modules, 3A to 3D, a plurality of drivers, 5A to 5D, corresponding to respective optical modules, 3A to 3D, a multiplexer 7, an etalon filter 9, a temperature controller 11 for the etalon filter, a beam splitter 13, a monitoring unit 15, and a plurality of TEC drivers, 17A to 17D, corresponding to respective TECs 33 implemented in the optical module, 3A to 3D.

Each of the optical modules, 3A to 3D, emits directly modulated light, L1 to L4, and installs the LD 31, the photodiode (hereafter denoted as PD) 32, the TEC 33, and a temperature sensor 35 mounted on the TEC 33 to sense a temperature of the LD 31. The block diagram of FIG. 1 only illustrates the inside of the optical transmitter 3A, but other optical modules, 3B to 3D, provide the same arrangement with that of the first module 3A.

The LD 31 has the type of, what is called, the distributed feedback LD (hereafter denoted as DFB-LD). The DFB-LD 31 is mounted on the TEC 33 and the front facet 31a is optically coupled with the multiplexer 7, while, the rear facet 31b thereof is optically coupled with the monitor PD 32. The DFB-LD installed in the optical module 3A emits signal light L1 by being provided with the driving current from the drivers 5A. The light emitted from the rear facet 31b of the DFB-LD 31 is monitored by the monitor PD 32 and the electrical signal corresponding to the monitored light is provided to the driver 5A. The driver 5A provides the driving current to the DFB-LD 31 so as to keep the magnitude detected by the PD 32 constant, which is often called as the automatic power control (hereafter denoted as APC) feedback loop.

The TEC 33 controls the temperature of the DFB-LD 31. Top plate of the TEC 33 mounts the RFB-LD 31 and the temperature sensor 35 thereon, while, the bottom plate thereof comes in thermally contact with the housing of the module 3A. The temperature of the top plate of the TEC 33 is adjusted by providing the driving current Ip1 provided from the TEC driver 17A to the TEC 33. The direction of the driving current Ip1 may change the controlling mode, that is, whether the top plate is cooled down while the bottom plate is heated up, or the top plate is heated up while the bottom plate is cooled down.

The driver 5A provides the driving current modulated by the driving signal Tx1 to the module 3A. Specifically, the driver 5A receives the electrical transmission signal Tx1 from the outside of the transmitter 1 and generates the modulation current corresponding to the transmission signal Tx1 to discriminate the ON state from the OFF state of the DFB-LD 31. The driver 5A also generates the bias current that defines the OFF state of the DFB-LD 31 and provides the driving current that includes the modulation current superposed with the bias current.

Figure 3:
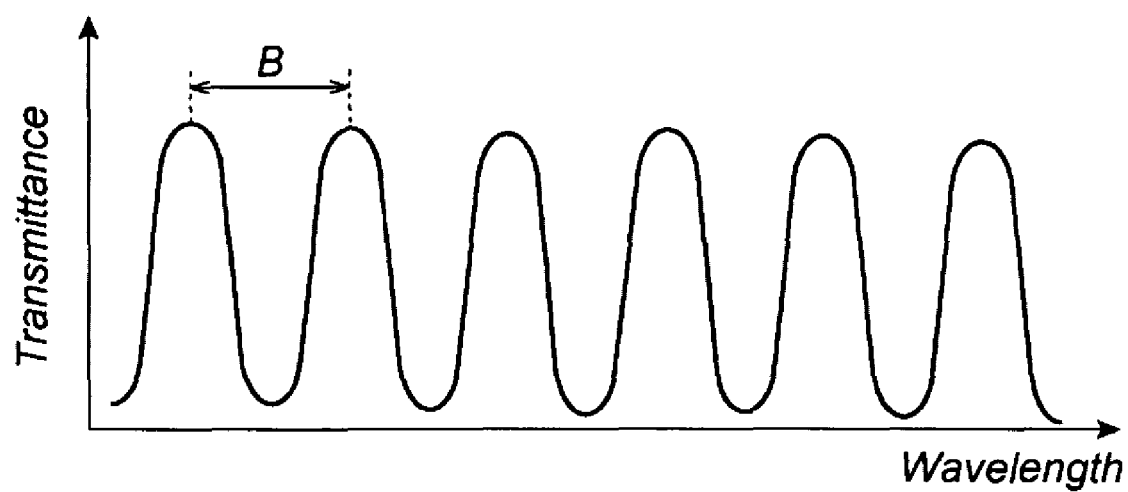
FIG. 3 schematically illustrates a transmittance of an etalon filter.

The optical multiplexer 7 is optically coupled with respective optical modules, 3A to 3D, in the input terminals thereof to multiplex the signal light, L1 to L4, output from the optical modules, 3A to 3D. The output of the multiplexer 7 optically couples with the etalon filter 9 to provide the multiplexed light L5 to the etalon filter 9. The etalon filter 9 transmits specified components of the multiplexed light L5 to the optical fiber F through the beam splitter 13. FIG. 3 shows a typical transmittance of the etalon filter 9, that is, the spectrum shows a periodic behavior. In FIG. 3, the horizontal axis corresponds to the wavelength, while, the vertical axis shows the transmittance. In a feature of the present embodiment, the period B of the transmittance of the etalon filter 9, or the integral multiplication of the period B coincides with the wavelength span of the signal light, L1 to L4, output from the optical modules, 3A to 3D.

The temperature controller 11 controls the temperature of the etalon filter 9 and includes a TEC 111 and a TEC driver 112 for providing the driving current Ip5 to the TEC 111. Similar to the TEC 33 installed within the module 3A, the TEC 111 controls the temperature of the etalon filter 9 mounted on the top plate of the TEC 111. The mode to control the temperature, namely, heating up or cooling down the filter 9, depends on the direction of the driving current Ip5. The TEC driver 112, by receiving the sensed signal from a temperature sensor also mounted on the top plate of the TEC 111, provides the driving current Ip5 to the TEC 111 so as to set the sensed signal to be a preset condition.

The beam splitter 13 splits the light output from the etalon filter 9. Most portion of the light split by the beam splitter 13 heads the optical fiber F that optically couples with the beam splitter 13, while, rest portion L7 of the light that is split by the splitter 13 heads the optical de-multiplexer 19 in the monitoring unit 15.

The monitoring unit 15 includes the optical de-multiplexer 19 and a plurality of monitoring PDs, 21A to 21D. The de-multiplexer 19 de-multiplexes the light L7 split by the beam splitter 13 into four beams each corresponding to the signal light, L1 to L4, and having the wavelength of λ1 to λ4, respectively. Each of light is detected by the monitor PD, 21A to 21D, which outputs the electrical signal corresponding to the magnitude of respective signal light.

The TEC drivers, 17A to 17D, each controls the driving current, Ip1 to Ip4, supplied to the TEC 33 installed in respective optical modules, 3A to 3D, by responding to the electrical signal output from the monitor PD, 21A to 21D. Specifically, each of the TEC drivers adjusts the driving current, Ip1 to Ip4, such that the electrical signal output from the monitor PD substantially coincides with respective preset conditions, which equivalently controls the power of the signal light, L1 to L4.

The CML technique reduces the degradation of the optical waveform due to the wavelength chirp. That is, the CML technique only transmits the light corresponding to the ON level and cuts the light corresponding to the OFF level by the filter with the sharp cut-off characteristic, typically the etalon filter. Thus, the signal light output from the filter excludes the OFF level to show the narrow spectrum, which may be effectively escaped from the dispersion of the optical fiber.

Figure 4A:
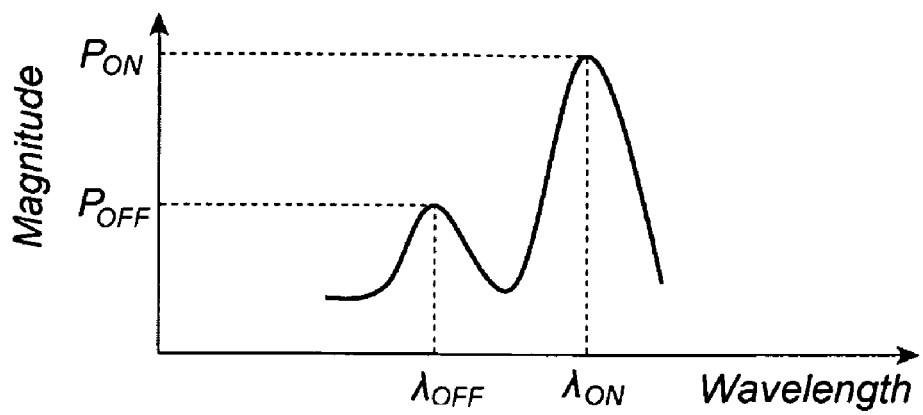
FIG. 4A schematically illustrates a spectrum of signal light, FIG. 4B schematically illustrates a relation between the spectrum of signal light and the transmittance of the etalon filter, and FIG. 4C schematically illustrates a spectrum of the signal light output from the etalon filter.
Figure 4B:
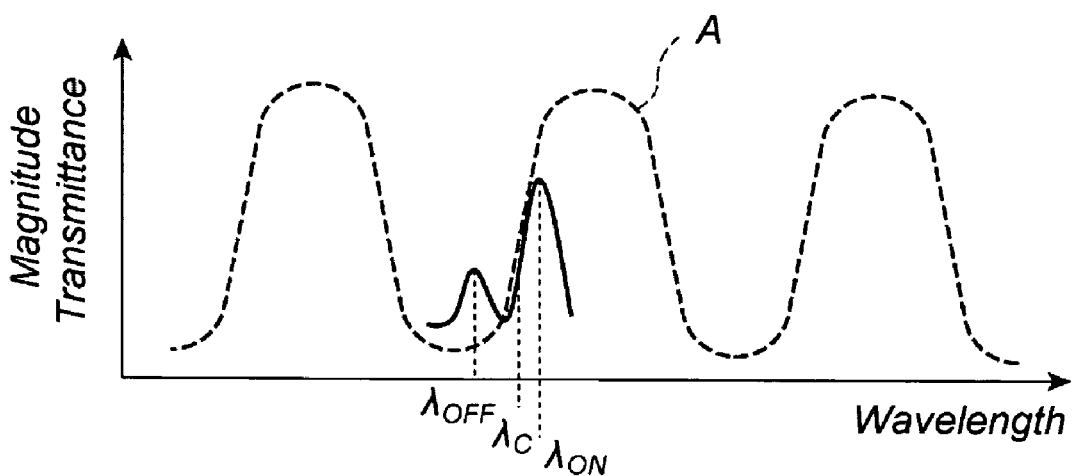
Figure 4C:
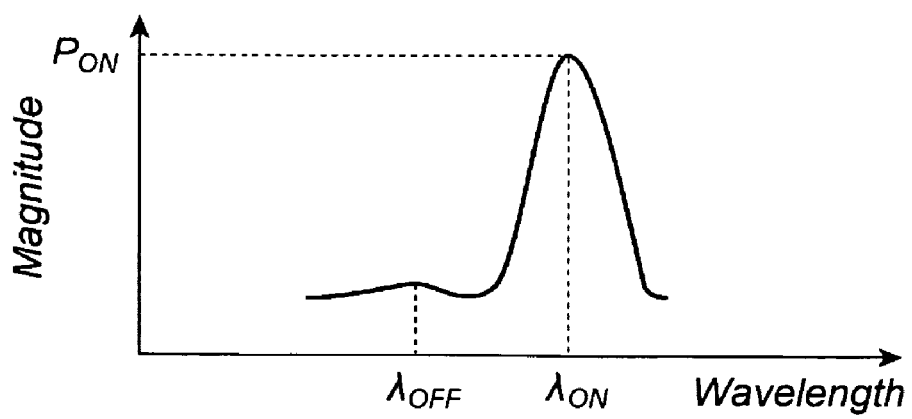

FIGS. 4A to 4C schematically illustrate the mechanism of the CML technique. In FIG. 4A, when the optical transmitter directly modulates the DFB-LD, the output spectrum from the DFB-LD typically becomes that shown in FIG. 4A, where two peaks each corresponds to the OFF level and to the ON level of the signal appears because the carrier density in the active region of the DFB-LD becomes different from each other. That is, the carrier density at the ON level becomes greater than that at the OFF level because the ON level corresponds to the situation where the modulation current is superposed on the bias current.

The wavelength $\lambda_{ON}$ when the DFB-LD is in the ON level becomes slightly longer than that $\lambda_{OFF}$ where the DFB-LD is in the OFF level, while, the peak magnitude of the spectrum, $P_{ON}$ and $P_{OFF}$, depends on the magnitude of the driving current supplied to the DFB-LD. The modulation current is superposed on the bias current at the ON level, while, only the bias current is supplied thereto at the OFF level; then the peak magnitude $P_{ON}$ in the ON level becomes larger than that $P_{OFF}$ at the OFF level. When such signal light with two peaks distinguishable to each other is transmitted in the optical fiber, the dispersion of the fiber inevitably degrades the signal waveform and the receiver may erroneously recover the transmitted data.

The CML technique cuts one of the peaks, the peak corresponding to the OFF level, or wavelengths around the OFF wavelength $\lambda_{OFF}$ by the optical filter. FIG. 4B schematically illustrates the function of the etalon filter. The etalon filter has the transmittance A with transmissive regions and non-transmissive regions repeatedly. The CML technique adjusts the relation between the emission spectrum of the DFB-LD shown in FIG. 4A and the transmission spectrum A of the etalon filter such that the wavelength $\lambda_{OFF}$ of the OFF level is in the non-transmissive region while the wavelength $\lambda_{ON}$ of the ON level is in the transmissive region of the filter next to the non-transmissive region.

Thus, the output from the filter 9 in the spectrum thereof becomes those schematically illustrated in FIG. 4C, where the component of the OFF level may be eliminated from the original spectrum and only the ON level may be left in the spectrum, which may narrow the width of the output spectrum. The cut-off wavelength $\lambda_C$ of the etalon filter 9 corresponds to a wavelength where the slope of the transmission spectrum of the filter becomes a maximum.

FIG. 4B illustrates a condition where the wavelength $\lambda_{ON}$ of the ON level is in the transmissive region A, while, the wavelength $\lambda_{OFF}$ of the OFF level is between the transmissive regions. However, an opposite condition may be considered where the wavelength $\lambda_{OFF}$ is in the transmissive region A, while, the wavelength $\lambda_{ON}$ is between the transmissive regions A. In such a case, the light reflected by the filter shows the spectrum such as those illustrated in FIG. 4C.

The optical transmitter 1 according to the present embodiment operates as follows. Solid lines, G1 to G4, appeared in FIG. 5 correspond to respective signal light, L1 to L4, and have two peaks each corresponding to the ON level and to the OFF level. That is, the ON level of respective signal light has the wavelengths, $\lambda_{ON1}$ to $\lambda_{ON4}$, while, the OFF level has the wavelength of $\lambda_{OFF1}$ to $\lambda_{OFF4}$, each slightly shifts toward shorter wavelength side. The dotted line G5 in FIG. 5 is the transmission spectrum of the etalon filter 9, which may be referred to FIG. 3.

Figure 5:
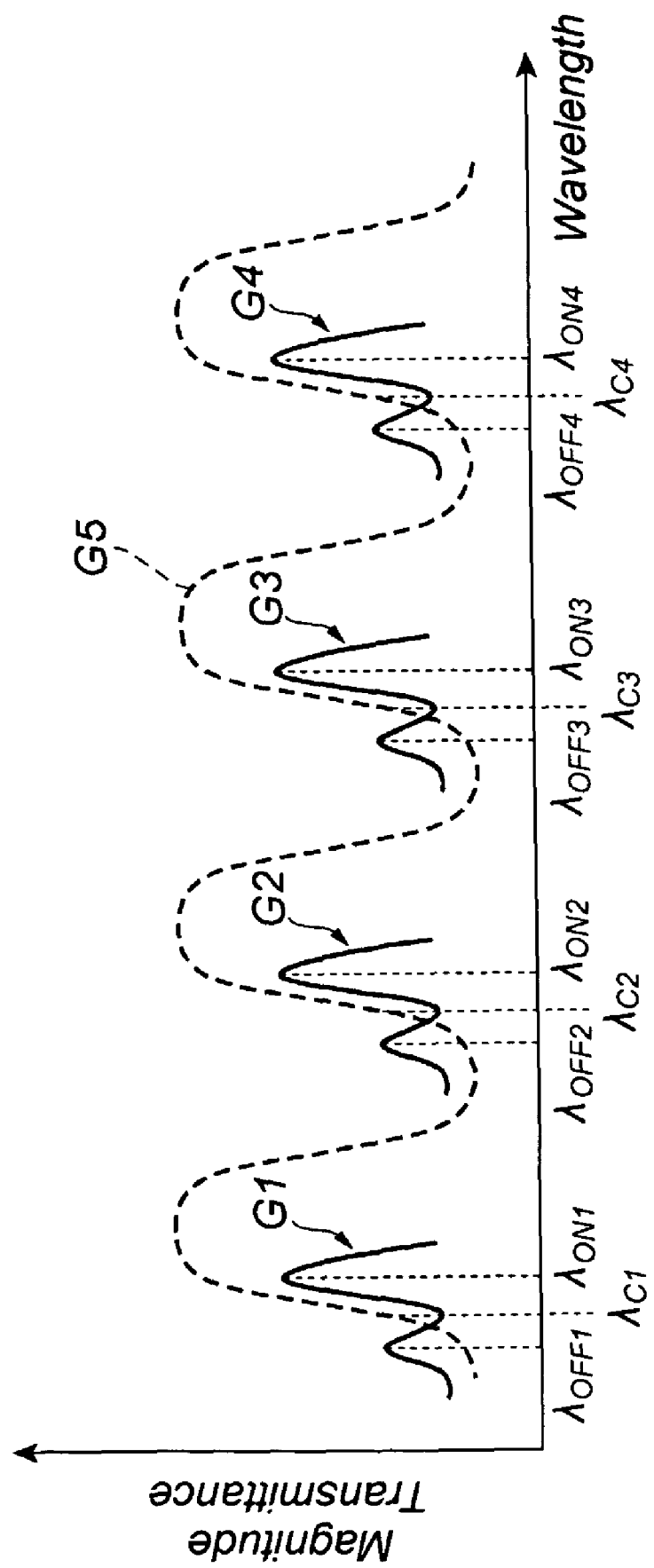
FIG. 5 schematically illustrates a relation between a plurality of signal light and the transmittance of the etalon filter.

The etalon filter 9 inherently provides the periodic spectrum as shown in FIG. 5. Moreover, the period B of the transmission spectrum according to the present embodiment coincides with the span between the wavelengths, $\lambda_{ON1}$ to $\lambda_{ON4}$, of the optical signals, and the wavelengths, $\lambda_{ON1}$ and $\lambda_{OFF1}$, are arranged in respective sides of the wavelength $\lambda_{Cl}$, where the variation of the transmittance becomes a maximum, for the first signal light L1. Similar arrangements are appeared for other signal light, L2 to L4.

That is, the wavelengths, $\lambda_{ONn}$, and $\lambda_{OFFn}$, for the ON level and the OFF level, respectively, are arranged in respective sides of the 20 critical wavelengths, $\lambda_{Cn}$. Although FIG. 5 illustrates that the wavelengths, $\lambda_{ON1}$ to $\lambda_{ON4}$, for the ON level are arranged in the next trasnsmissive region without any vacant assignment, the allocation of the wavelengths for the ON level are not restricted to such an arrangement. Some sparse allocation may be applicable, where the wavelengths for the ON level are arranged in apart transmissive regions. A condition where the wavelengths for the ON level $\lambda_{ONn}$ and that for the OFF level $\lambda_{OFFn}$ are arranged so as to put the wavelength $\lambda_{Cn}$, where the variation of the transmittance becomes a maximum, therebetween may be satisfied.

Figure 6:
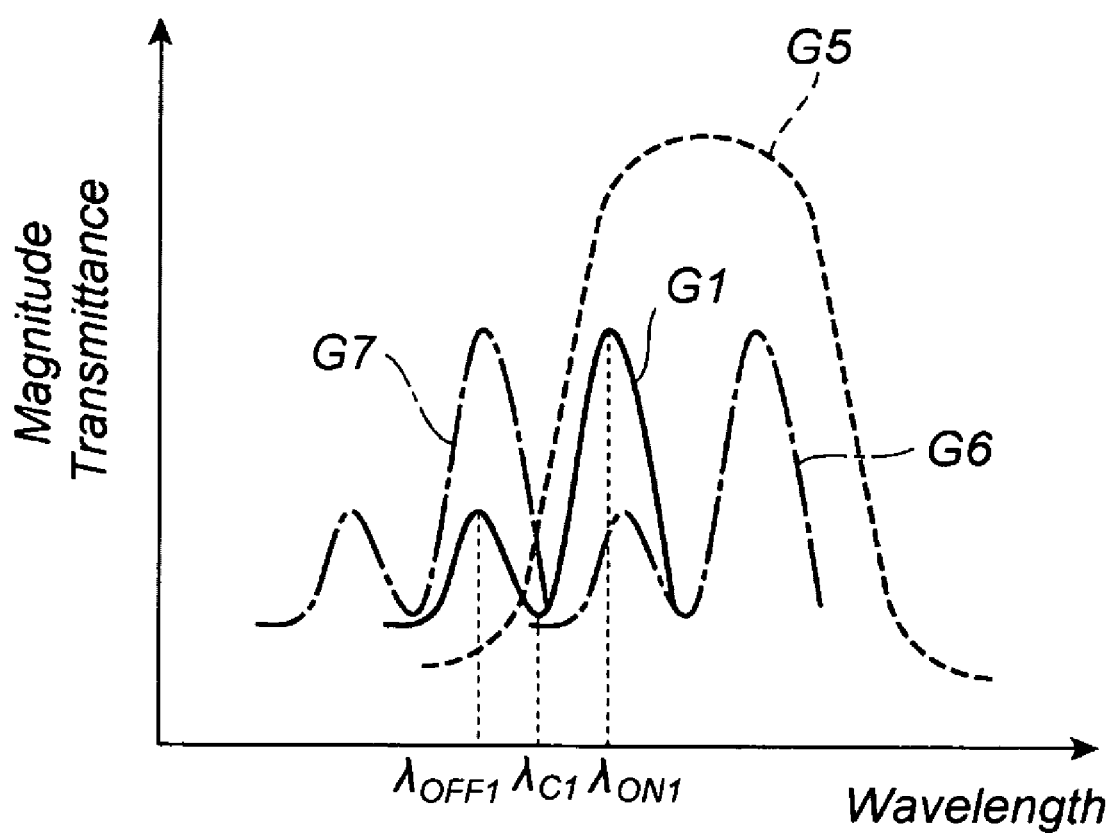
FIG. 6 describes a behavior of the signal light (1) adequately adjusted between the transmissive and non-transmissive regions of the etalon filter, (2) slightly shifted toward a longer wavelength side and (3) slightly shifted toward a shorter wavelength side.

Next, a method to adjust the wavelengths, $\lambda_{ONn}$ and $\lambda_{OFFn}$, of the signal light Ln with respect to the wavelength $\lambda_{Cn}$ of the etalon filter will be described in detail by referring to a case for the first signal light L1. FIG. 6 schematically illustrates a relation between the wavelengths, $\lambda_{ON1}$ and $\lambda_{OFF1}$, of the signal light L1 and the wavelength $\lambda_{Cn}$ of the etalon filter 9. The behavior G1 in FIG. 6 shows a condition where the wavelengths, $\lambda_{ON1}$ and $\lambda_{OFF1}$, put the critical wavelength $\lambda_{Cl}$ therebetween.

When the spectrum of the signal light L1 shifts toward the longer wavelength, where both wavelengths $\lambda_{ON1}$ and $\lambda_{OFF1}$, are involved within the transmissive region of the etalon filter, which is illustrated by a behavior G6, the component of the OFF level with the wavelength $\lambda_{OFF1}$ becomes to pass the etalon filter, thus, the output power of the etalon filter increases. When the spectrum of the signal light L1 oppositely shifts toward the shorter wavelength as illustrated in a behavior G7 in FIG. 6, the wavelength $\lambda_{ON1}$ locates in the non-transmissive region of the etalon filter, which decreases the output power from the etalon filter.

Accordingly, the optical transmitter 1 controls the module 3A such that the output power of the component L1 included in the light L6 output from the etalon filter 9 and monitored by the PD 21A in the monitoring unit 15 becomes substantially equal to a preset value between the maximum and the minimum thereof. Because the emission wavelength of the LD 31 depends on the temperature thereof, the TEC controller 17A adjusts the driving current Ip1 for the TEC 33 in the magnitude and the direction thereof based on the monitored signal output from the PD 21A such that the wavelengths, $\lambda_{ON1}$ and $\lambda_{OFF1}$, put the critical wavelength $\lambda_{Cl}$ therebetween, which corresponds to the condition that the magnitude of the signal light L1 becomes the preset value between the maximum and the minimum. Similar control may be carried out for the other modules, 3B to 3D.

A few preferred embodiments have been described in detail hereinabove. It is to be understood that the scope of the invention also comprehends embodiments different from those described, yet within the scope of the claims. For instance, the optical transmitter of the embodiment multiplexes four optical signals, L1 to L4. However, the invention may be applicable to multiplex at least two optical signals. The present invention, therefore, is limited only as claimed below and the equivalents thereof.

I claim:

1. An optical transmitter outputting at least two signal light with a preset wavelength span, comprising:
   at least two optical modules each including,
      a laser diode directly modulated with an electrical signal with an ON level and an OFF level, said diode emitting said signal light with a first wavelength corresponding to said ON level of said electrical signal and with a second wavelength corresponding to said OFF level of said electrical signal,
      a thermo-electric controller to control a temperature of said laser diode, and
      a TEC driver to drive said thermo-electric controller,
      wherein one of said at least two optical modules outputs one of said at least two signal light and another optical modules outputs another signal light;
   a multiplexer configured to multiplex said at least two signal light from respective optical modules;
   an etalon filter with a periodic transmittance with a period substantially coinciding with said preset wavelength span of said two signal light, said etalon filter receiving an output of said multiplexer; and
   a monitoring unit configured to receive an output of said etalon filter and to output monitored signals each corresponding to said at least two signal light,
   wherein said TEC driver controls said temperature of said laser diode such that said first wavelength and said second wavelength of said signal light emitted from said laser diode locate in both sides of a critical wavelength of said etalon filter where a variation of said transmittance becomes a maximum.

2. The optical transmitter according to claim 1,
   wherein said critical wavelength corresponding to one of said at least two optical modules and said critical wavelength corresponding to another optical module are adjacent to each other in said periodic transmittance.

3. The optical transmitter according to claim 2,
   wherein said TEC driver drives said thermo-electric controller such that said monitored signal corresponding to said one of signal light becomes a preset value between a maximum and a minimum.

4. The optical transmitter according to claim 1,
   wherein said critical wavelength corresponding to one of said at least two optical modules and said critical wavelength corresponding to another optical module are apart to each other in said periodic transmittance putting at least one critical wavelength of said etalon filter therebetween.

5. The optical transmitter according to claim 4,
   wherein said TEC driver drives said thermo-electric controller such that said monitored signal corresponding to said one of signal light becomes a preset value between a maximum and a minimum.

6. The optical transmitter according to claim 1,
   wherein said first wavelength locates in a transmissive region of said etalon filter and said second wavelength locates in a non-transmissive region adjacent to said transmissive region of said etalon filter.

7. An optical transmitter comprising:
   a plurality of optical modules each including,
      a laser diode directly modulated with an electrical signal with an ON level and an OFF level, said laser diode emitting signal light containing components with a first wavelength corresponding to said ON level and a second wavelength corresponding to said OFF level, respectively,
      a thermo-electric controller configured to control a temperature of said laser diode, said first wavelength and said second wavelength depending on said temperature, and
      a TEC driver configured to drive said thermo-electric controller;
   an optical multiplexer configured to multiplex said signal light from respective optical modules; and
   an etalon filter configured to transmit an output of said optical multiplexer, said etalon filter having a transmittance with a transmissive region and a non-transmissive region iterating to each other by a period,
   wherein said first wavelength and said second wavelength output from one of optical modules are in a transmissive region and in a non-transmissive region adjacent to said transmissive region of said etalon filter, respectively, under a control of said TEC driver in said one of optical modules, and said first wavelength and said second wavelength output from another one of said optical modules are in another transmissive region and in another non-transmissive region adjacent to said another transmissive region of said etalon filter, respectively, under a control of said TEC driver in said another one of optical modules.

8. The optical transmitter according to claim 7,
   wherein said first wavelength of said signal light output from said one of optical modules and said first wavelength of said signal light output from another one of said optical modules are apart by an integer multiplication of said period of said etalon filter.

9. The optical transmitter according to claim 7,
   further comprising:
      a beam splitter configured to split light transmitted through said etalon filter,
      an optical de-multiplexer configured to de-multiplex split light output from said beam splitter depending on wavelengths contained in said split light, and
      a plurality of photodiodes each monitors one of de-multiplexed light,
   wherein said TEC driver drives said thermo-electric controller in said one of optical modules based on an output of one of said photodiodes that monitors light with a wavelength coincides with said first wavelength of said signal light output from said one of optical modules.

10. The optical transmitter according to claim 9,
   wherein said TEC driver drives said thermoelectric controller in said one of optical modules such that said output of said one of photodiodes becomes a preset value between a maximum and a minimum.

* * * * *